United States Patent
Takeuchi et al.

(10) Patent No.: US 9,561,801 B2
(45) Date of Patent: Feb. 7, 2017

(54) VEHICLE CONTROL SYSTEM

(71) Applicant: TOYOTA JIDOSHA KABUSHIKI KAISHA, Toyota-shi, Aichi (JP)

(72) Inventors: Keisuke Takeuchi, Toyota (JP); Masaki Suzuki, Toyota (JP); Toshio Tanahashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/891,929

(22) PCT Filed: Jul. 11, 2013

(86) PCT No.: PCT/JP2013/069007
§ 371 (c)(1),
(2) Date: Nov. 17, 2015

(87) PCT Pub. No.: WO2015/004777
PCT Pub. Date: Jan. 15, 2015

(65) Prior Publication Data
US 2016/0107649 A1    Apr. 21, 2016

(51) Int. Cl.
*B60W 30/182*    (2012.01)
*B60W 50/06*    (2006.01)
(Continued)

(52) U.S. Cl.
CPC ...... *B60W 30/182* (2013.01); *B60W 30/18009* (2013.01); *B60W 40/09* (2013.01);
(Continued)

(58) Field of Classification Search
CPC ............... B60W 30/182; B60W 30/18009; B60W 50/06; B60W 40/09; B60W 2710/30; B60W 2710/20; B60W 2540/18; B60W 2540/12; B60W 2540/10; B60W 2720/106; B62D 6/007; B62D 6/02
See application file for complete search history.

(56) References Cited

U.S. PATENT DOCUMENTS

2012/0062375 A1    3/2012    Takeuchi et al.
2012/0136506 A1*   5/2012    Takeuchi ............ B60G 17/016
                                                                    701/1
(Continued)

FOREIGN PATENT DOCUMENTS

JP    2012-061944 A    3/2012
JP    2012-158222 A    8/2012
(Continued)

*Primary Examiner* — Michael J Zanelli
(74) *Attorney, Agent, or Firm* — Oliff PLC

(57) ABSTRACT

A vehicle control system is configured to decrease a value of the index upon reduction in an absolute value of acceleration detected continuously during propulsion of the vehicle to fall below a predetermined value toward zero, as compared to that of a case in which the absolute value of the instant acceleration is larger than the predetermined value (steps S1 to 5). The acceleration includes at least any of an instant forward acceleration established by operating an accelerator, an instant longitudinal acceleration established by operating the accelerator or a brake, and an instant synthesized acceleration of the instant longitudinal acceleration and an instant lateral acceleration established by operating a steering wheel.

15 Claims, 7 Drawing Sheets

(51) Int. Cl.
*B60W 40/09* (2012.01)
*B62D 6/00* (2006.01)
*B62D 6/02* (2006.01)
*B60W 30/18* (2012.01)

(52) U.S. Cl.
CPC ............ *B60W 50/06* (2013.01); *B62D 6/007* (2013.01); *B62D 6/02* (2013.01); *B60W 2540/10* (2013.01); *B60W 2540/12* (2013.01); *B60W 2540/18* (2013.01); *B60W 2710/20* (2013.01); *B60W 2710/30* (2013.01); *B60W 2720/106* (2013.01)

(56) References Cited

U.S. PATENT DOCUMENTS

| | | | |
|---|---|---|---|
| 2012/0143398 A1* | 6/2012 | Takeuchi | B60W 40/12 701/1 |
| 2012/0283923 A1 | 11/2012 | Yamada et al. | |
| 2014/0207334 A1* | 7/2014 | Noumura | F16H 61/10 701/37 |
| 2014/0316627 A1 | 10/2014 | Tanaka et al. | |
| 2015/0127200 A1 | 5/2015 | Takeuchi et al. | |

FOREIGN PATENT DOCUMENTS

| | | |
|---|---|---|
| JP | 2013-107532 A | 6/2013 |
| WO | 2013-011572 A1 | 1/2013 |
| WO | 2013-046308 A1 | 4/2013 |

\* cited by examiner

VEHICLE CONTROL SYSTEM

TECHNICAL FIELD

The present invention relates to a control system for a vehicle that is configured to control the vehicle in line with driver's intention or preference.

BACKGROUND ART

Control characteristics of a driving force generated by a prime mover in response to an operation of an accelerator, a speed ratio established by a transmission, a shift timing, a steering angle of front wheels with respect to a turning angle of a steering wheel, a damping characteristic of a suspension and so on are determined depending on a type of the vehicle. However, a driving preference of the driver (i.e., driver's disposition or intention) depending on a running condition such as a road condition varies from person to person and hence designed control characteristics may not meet driver's preference in every situation.

In the conventional art, control characteristics of acceleration and steering and so on can be changed by selecting a driving mode from sporty mode, a normal mode, and a mild mode, and those characteristics may be adjusted in line with the driver's preference. For example, PCT international publication WO 2013/011572 describes a vehicle control system configured to detect or judge desired sportiness of the driver based on an acceleration and a steering angle. Based on judgement result, the control system increases an engine power with respect to an operating amount of an accelerator, changes a speed ratio in such a manner to expand a high speed region where an engine speed is high, and increases a hardness of a suspension.

The vehicle control system taught by WO 2013/011572 is configured to adjust the control characteristics of the vehicle based on an index representing the driver's preference determined based on a longitudinal acceleration, a synthesized acceleration of longitudinal acceleration and lateral acceleration, an absolute value of acceleration, or an estimated value of acceleration. According to the teachings of WO 2013/011572, specifically, an instant SPI is determined based on an instant value of acceleration detected continuously, and the instant SPI is updated when the current SPI exceeds the previous SPI to be used to calculate a command SPI. By contrast, if the instant SPI is fluctuating below the command SPI for a certain period of time, the command SPI is maintained until a predetermined condition is satisfied, specifically, until an integral deviation therebetween exceeds a threshold value, and then the instant SPI is lowered. That is, the command SPI calculated based on the instant SPI is increased immediately with an increase of the instant SPI, but lowered after a delay with respect to a drop of the instant SPI. Thus, the vehicle control system taught by WO 2013/011572 is configured to adjust the control characteristics of a relation between an accelerator opening and an engine torque, an assist amount of steering, or a damping characteristic of the suspension based on the command SPI.

However, acceleration of the vehicle is easily to be generated and sensed at a low speed, but difficult to be generated and sensed at a high speed. Therefore, if the index is calculated based on the (longitudinal) acceleration irrespective of vehicle speed, a determination of the fact that the driver prefers a sporty driving would be satisfied too easily at a low speed, and would be satisfied too difficult at a high speed. Consequently, a determination accuracy of the driving preference would be deteriorated. In order to avoid such disadvantage, according to the teachings of WO 2013/011572, the instant value of longitudinal (or forward) acceleration to be used to calculate the index is weighted to be increased at a low speed as compared that at a high speed.

According to the teachings of WO 2013/011572, accuracy of adjusting the control characteristics based on the driver's preference can be improved by thus correcting the acceleration in accordance with vehicle speed. However, an accelerator pedal is depressed and returned even during cruising at a constant speed to adjust a driving torque against a road load and air resistance. Specifically, the accelerator pedal is depressed when the driver feels that the vehicle speed is lowered, and then returned when the driver senses increase in acceleration. Such operations of the accelerator to adjust acceleration may be reflected on the index representing sportiness of driving. For example, in the above-explained vehicle control system using the command SPI, the command SPI is prevented from being lowered easily if a deviation between the command SPI and the instant SPI fluctuating below the command SPI is small. This is because the acceleration is increased to a certain extent and hence the control system determines a fact that the driver demands a sporty running.

As shown in FIG. 11, a minimum value of a change in acceleration that can be sensed by the driver during cruising at a constant speed is larger in a high speed range as compared to that in a low speed range. Therefore, the accelerator would be unintentionally opened widely by the driver during cruising at a high speed. That is, such operation of the accelerator to keep the vehicle cruising would be erroneously reflected on the index representing the driving preference in the high speed range. Consequently, the index would not be lowered even under the situation to be lowered and hence the control characteristics would be deviated from the driver's intention.

DISCLOSURE OF THE INVENTION

The present invention has been conceived noting the foregoing technical problems, and it is therefore an object of the present invention is to provide a vehicle control system for realizing a running performance desired by the driver by properly adjusting control characteristics based on an operation of an accelerator.

The vehicle control system according to the present invention is configured to calculate an index based at least on a longitudinal acceleration of a vehicle established by an operation of a driver in such a manner that the index is increased with an increase in the acceleration, and to set or adjust control characteristics of the vehicle in such a manner that agility of the vehicle is enhanced with an increase in the index and that agility of the vehicle is moderated with a reduction in the index. In order to achieve the above-explained objective, according to the present invention, the vehicle control system is further configured to weight to decrease a value of the index upon reduction in an absolute value of acceleration detected continuously during propulsion of the vehicle to fall below a predetermined value toward zero, as compared to that of a case in which the absolute value of the instant acceleration is larger than the predetermined value. The acceleration includes at least any of an instant forward acceleration established by operating an accelerator, an instant longitudinal acceleration established by operating the accelerator or a brake, and an instant synthesized acceleration of the instant longitudinal acceleration and an instant lateral acceleration established by operating a steering wheel.

Specifically, the index may be calculated based on a weighted value of the instant forward acceleration and a weighted value of an operating amount of the driver in such a manner that the index is increased with an increase in the operating amount to change the forward acceleration of the vehicle. The vehicle control system may be further configured to reduce the weight on the operating amount and increase the weight on the instant forward acceleration upon reduction in the absolute value of any of the instant forward acceleration, the instant longitudinal acceleration, and the instant synthesized acceleration to fall below a predetermined value toward zero, as compared to those of a case in which the absolute value of the instant acceleration is larger than the predetermined value.

The weight to decrease the index may be decreased based on a vehicle speed. Specifically, the weight decreases a value of the index with an increase in a vehicle speed under a condition that the absolute value of any of the instant forward acceleration, the instant longitudinal acceleration, and the instant synthesized acceleration is smaller than the predetermined value, as compared to that of a case in which the vehicle speed is low.

The weight to decrease the index may include a weight to decrease the index upon reduction in the absolute value of any of the instant forward acceleration, the instant longitudinal acceleration, and the instant synthesized acceleration to fall below a predetermined value toward zero, and with an increase in the vehicle speed, as compared to that of a case in which the vehicle speed is low.

The weight on the operating amount may include a weight to suppress a change in a value of the index with an increase in the vehicle speed.

Specifically, the operating amount may be an opening degree of an accelerator, and the weight on the operating amount may suppress a change in a value of the index with an increase in the opening degree of the accelerator.

The index may be calculated based on the instant acceleration obtained continuously during propulsion of the vehicle, and held to a value calculated based on the absolute value. In addition, the index may include a command index that is set to the absolute value of the instant acceleration, and updated upon exceedance of the value being held to be held thereto.

The vehicle control system may be provided with: an index holding means that calculates the index based on the instant acceleration obtained continuously during propulsion of the vehicle, and that updates the command index when the absolute value of the instant acceleration exceeds the current value of the command index calculated based on a prior absolute value of the instant acceleration; and an index decreasing means that decreases the command index being held upon satisfaction of a predetermined condition. Specifically, the predetermined condition is satisfied based on an elapsed time in which the instant acceleration stays below the command index being held.

The weighting may be a numerical processing to reduce the absolute value of the instant acceleration.

Specifically, the weighting may be a processing to multiply the absolute value of the instant acceleration by a factor larger than zero but smaller than "1".

The factor that may be varied continuously in response to a change in the instant acceleration.

The vehicle control system may be further provided with a deceleration force control means that controls a deceleration force of the vehicle. In this case, the vehicle control system may adjust the control characteristics of the vehicle based on the index in such a manner to save fuel, by reducing the deceleration force of the vehicle by the deceleration control means with a reduction in a reduction in a deceleration demand.

The vehicle may be provided with a motor serving as a prime mover. In this case, the vehicle control system may adjust a control characteristic of the motor based on the index in such a manner to improve an energy efficiency of the motor when the absolute value of the instant acceleration is smaller than the predetermined value.

The vehicle may be provided with an air conditioner. In this case, the vehicle control system may adjust a control characteristic of the air conditioner based on the index in such a manner to lighten a load on the air conditioner when the absolute value of the instant acceleration is smaller than the predetermined value, as compared to that of the case in which the absolute value of the instant acceleration is larger than the predetermined value.

The vehicle may be provided with an assisting mechanism that assists a steering force. In this case, the vehicle control system may adjust a control characteristic of the assisting mechanism based on the index in such a manner to reduce an assisting amount of the steering force when the absolute value of the instant acceleration is smaller than the predetermined value, as compared to that of the case in which the absolute value of the instant acceleration is larger than the predetermined value.

Thus, according to the present invention, the vehicle control system determines a fact that the driver has a desire to enhance agility of the vehicle when the driver opens the accelerator widely so that the forward acceleration of the vehicle is increased, and calculates the index to adjust the control characteristics of the vehicle based on the determination result. To this end, the vehicle control system basically calculates the index based on the opening degree of the accelerator or a change rate thereof. However, the accelerator may not always be operated to increase the forward acceleration of the vehicle. Therefore, the vehicle control system is configured to calculate the index without taking account of such operation of the accelerator executed not to increase the forward acceleration.

Specifically, during cruising the vehicle at a substantially constant speed, the index to adjust the control characteristics of the vehicle is weighted to be decreased with a reduction in the absolute value of the longitudinal acceleration to fall below a predetermined value toward zero, as compared to that of a case in which the absolute value of the instant acceleration is larger than the predetermined value. According to the present invention, therefore, even if the accelerator pedal is operated to change the longitudinal acceleration to maintain the vehicle speed at a constant speed in the high speed range, such change in the acceleration will not be reflected in the index to change the control characteristics of the vehicle. That is, the vehicle can be maintained easily to cruise in the high speed range. By contrast, in the low speed range, the a minimum value of a change in the longitudinal acceleration that can be sensed immediately by the driver during cruising is rather small, and hence an operating amount to change the longitudinal acceleration is also small. That is, if the accelerator is operated significantly in the low speed range, this means that the driver has a desire to drive the vehicle in the sporty manner. Therefore, such operation of the accelerator in the low speed range is reflected on the index to adjust the control characteristics of the vehicle in such a manner to enhance agility of the vehicle. Thus, according to the present invention, the index can be calculated while accurately reflecting the driver's intention that is difficult to be estimated during cruising at a high speed.

DETAILED DESCRIPTION OF THE PREFERRED EMBODIMENT(S)

According to the present invention, there is provided a vehicle control system that is configured to adjust or change control characteristics based on at least an absolute value of instant acceleration in a forward direction established by operating an accelerator, an absolute value of instant acceleration in a longitudinal direction established by operating the accelerator and a brake, and an absolute value of instant synthesized acceleration with a lateral acceleration established by operating a steering wheel. That is, according to the present invention, the above-mentioned absolute values of the instant acceleration in the forward direction, the instant acceleration in the longitudinal direction, and the instant synthesized acceleration are used as an index representing a driving preference of the driver, and the index at each moment is processed to be used as a command index. In the following description, such index representing a driver's preference (i.e., driver's mind) from the present to few seconds later will be called the "instant DMI", and the command index obtained by processing the instant DMI will be called the "command DMI".

Figure 10:
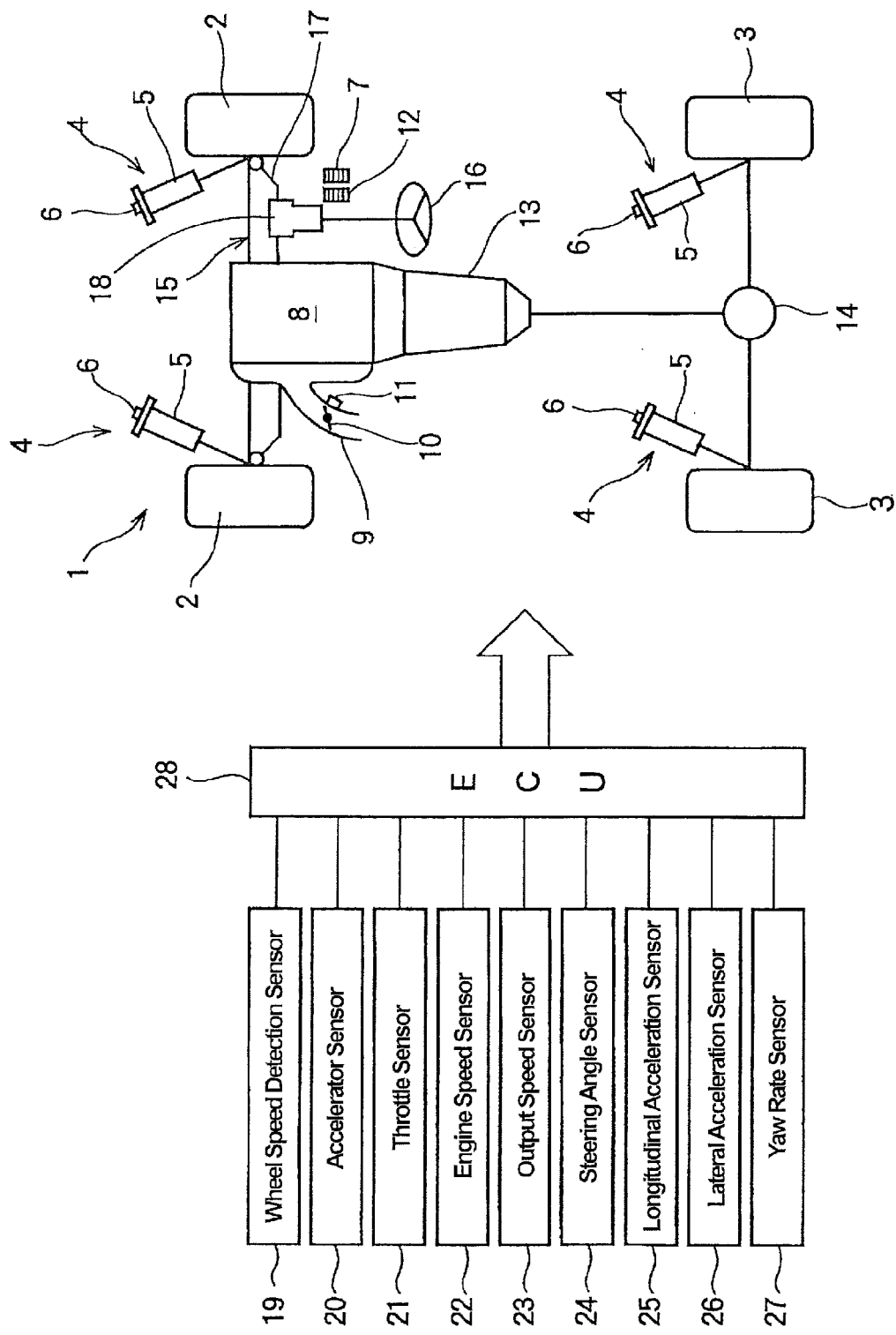
FIG. 10 is a schematic illustration showing a vehicle to which the vehicle control system according to the present invention is applied.

The vehicle control system according to the present invention may be applied to a conventional vehicle to adjust the control characteristics by the above-mentioned index. For example, the vehicle to which the vehicle control system is applied is described in the above-mentioned PCT international publication WO 2013/011572. A structure of the vehicle shown therein will be explained with reference to FIG. 10. As shown in FIG. 10, the vehicle 1 is provided with a pair of front wheels 2 and a pair of rear wheels 3. Specifically, each of the front wheel 2 serve as a steering wheel, and each of the rear wheel 3 serves as a driven wheel. Those wheels 2 and 3 are individually attached to a not shown vehicle body via a suspension 4. The suspension 4 is a conventional suspension mechanism composed mainly of a not shown spring and a shock absorber (i.e., a damper) 5. In the shock absorber 5 a flow resistance therein can be changed by a motor 6 functioning as an actuator. For example, when increasing the flow resistance in the shock absorber 5, a hardness of the suspension 4 is enhanced so that the vehicle 1 becomes difficult to be depressed. As a result, the drive feeling of the vehicle 1 becomes much sporty rather than comfortable. In addition, the wheels 2 and 3 are individually provided with a brake device operated by an antilock brake system (abbreviated as ABS).

An output power of an engine 8 is controlled by changing an opening degree of a throttle valve 10 arranged in an intake pipe 9. Specifically, the throttle valve 10 is an electronic throttle valve that is opened and closed by an actuator 11 such as a motor controlled electrically, and an opening degree of the throttle valve 10 is adjusted to in accordance with a depression of an accelerator pedal 12.

A relation between an opening degree of the accelerator and an opening degree of the throttle valve 10 may be adjusted arbitrarily, and if a ratio of the opening degree of the accelerator to the opening degree of the throttle valve is approximately one to one, the throttle valve 10 reacts directly to the operation of the accelerator so that the sportiness of behavior of the vehicle 1 is enhanced. To the contrary, in case of reducing the opening degree of the throttle valve 10 relatively with respect to the opening degree of the accelerator, the behavior and the acceleration of the vehicle 1 is moderated. In an electric vehicle or a hybrid vehicle in which the motor is used as the prime mover, a current control device such as an inverter or a converter is used instead of the throttle valve 10. In this case, a relation between the opening degree of the accelerator and a current value, that is, characteristics of the behavior and the acceleration of the vehicle 1 are changed arbitrarily by adjusting the current in accordance with the opening degree of the accelerator by the current control device.

Any of automatic geared transmission, a belt-type continuously variable transmission, a toroidal type transmission may be used as a transmission 13. Basically, the transmission 13 is controlled to optimize the speed ratio to improve fuel economy. For this purpose, a speed change operation of the transmission 13 is carried out with reference to a preinstalled speed change map for determining the speed ratio according to a vehicle speed and an opening degree of the accelerator. Alternatively, the speed ratio of the transmission 13 may also be optimized by calculating a target output on the basis of the vehicle speed and the opening degree of the accelerator, calculating a target engine speed on the basis of the calculated target output and an optimum fuel curve, and carrying out a speed change operation to achieve the obtained target engine speed. Thus, the speed ratio is controlled depending on a running condition of the vehicle 1 such as the vehicle speed and the opening degree of the accelerator, and a pattern of controlling the speed ratio can be changed depending on the selected drive mode such as a sporty mode where an agility of behavior of the vehicle is enhanced, an economy mode where fuel economy is improved and so on. An output shaft of the transmission 13 is connected to the rear wheels 3 via a differential gear 14 serving as a final reduction.

A steering mechanism 15 is adapted to change an orientation of the front wheels 2. To this end, the steering mechanism 15 is provided with: a steering wheel 16; a steering linkage 17 configured to transmit a rotation of the steering wheel 16 to the front wheels 2; and an assist mechanism 18 adapted to assist a steering angle and a steering force of the steering wheel 16. For example, a change in a turning angle of each front wheels with respect to a steering force can be increased by increasing an assisting amount of the assist mechanism 18 such as a motor to milden agility of the vehicle. By contrast, given that the assisting mechanism 18 comprises a variable gear unit, a ratio of the steering force or angle of the steering wheel 16 to an actual steering force or angle of the front wheels 2 can be approximated to one to one by reducing the assisting force of the assist mechanism 18. As a result, the front wheels 2 can be turned directly in response to the rotation of the steering wheel 16 so that the sportiness of behavior of the vehicle 1 is enhanced.

Although not especially shown, in order to stabilize a behavior and attitude of the vehicle 1, the vehicle 1 is further provided with an antilock brake system (abbreviated as ABS), a traction control system, and a vehicle stability control system (abbreviated as VSC) for controlling those systems integrally. Those systems are known in the art, and configured to stabilize the behavior of the vehicle 1 by preventing a locking and slippage of the wheels 2 and 3. For this purpose, those systems are configured to control a braking force applied to the wheels 2 and 3 on the basis of a deviation between a vehicle speed and a wheel speed while controlling the engine torque. Optionally, the vehicle 1 may comprise a navigation system for obtaining data on road information and a contemplated route (i.e., data on driving environment), and a mode selecting switch for selecting a drive mode manually from the sporty mode, the normal mode, the energy saving mode (i.e., economy mode) and so on. In addition, a 4-wheel-drive mechanism (4WD) configured to change the driving characteristics such as a hill-climbing ability, acceleration, a turning ability and so on may be arranged in the vehicle 1.

In order to obtain data for controlling the engine 8, the transmission 13, the shock absorber 5 of the suspension 4, the assist mechanism 18, and the above-explained not shown systems, various kinds of sensors are arranged in the vehicle 1. For example, a wheel speed sensor 19 adapted to detect a rotational speed of each wheel 2 and 3, an accelerator sensor 20 adapted to detect an opening degree of the accelerator, a throttle sensor 21 adapted to detect an opening degree of the throttle valve 10, an engine speed sensor 22 adapted to detect a speed of the engine 8, an output speed sensor 23 adapted to detect an output speed of the transmission 13, a steering angle sensor 24, a longitudinal acceleration sensor 25 adapted to detect the longitudinal acceleration (Gx), a lateral acceleration sensor 26 adapted to detect the lateral (or transverse) acceleration (Gy), a yaw rate sensor 27 and so on are arranged in the vehicle 1. Here, acceleration sensors used in the above-explained behavior control systems such as the antilock brake system (ABS) and a vehicle stability control system (VSC) may be used as the acceleration sensors 25 and 26, and if an air-bag is arranged in the vehicle 1, acceleration sensors for controlling an actuation of the air-bag may also be used as the acceleration sensors 25 and 26. Detection signals (i.e., data) of those sensors 19 to 27 are transmitted to an electronic control unit (abbreviated as ECU) 28. The ECU 28 is configured to carry out a calculation on the basis of the data inputted thereto and data and programs stored in advance, and to output a calculation result to the above-explained systems or the actuators thereof in the form of a control command signal.

Various kinds of fuel saving controls can be carried out in the vehicle 1 to which the present invention is applied. For example, when the vehicle 1 is cruising without being propelled by the driving force, a decelerating force such as an engine braking force is reduced by reducing a clutch (not shown) of the transmission 13 disposed between the engine 8 and the driving wheels 3, or by bringing the clutch into disengagement. The functional means that reduces the decelerating force serves as the claimed deceleration force control means. Thus, according to the present invention, the decelerating force can be changed arbitrarily.

In the hybrid vehicle having both engine 8 and the motor, a driving force can be increased by increasing voltage applied to the motor, but an electric power loss is also increased as a result of increasing the voltage. In order to avoid such disadvantage, according to the present invention, an energy efficiency is improved by reducing the voltage applied to the motor or by reducing an increasing amount of the voltage when propelling the vehicle 1 in a mild manner.

In addition, when cruising the vehicle 1 in a mild manner according to the driver's intention, a set temperature of an air conditioner is automatically raised when cooling the vehicle interior and lowered when warming the vehicle interior to save the fuel.

As described, the longitudinal acceleration or the like is changed by an intentional operation of the accelerator by the driver. This means that the acceleration of the vehicle represents intention or preference of the driver. However, the accelerator is not always increased to increase the longitudinal acceleration for the purpose of enhancing agility of the vehicle. According to the preferred example, therefore, the longitudinal acceleration is weighted (or corrected) to be used as a parameter to calculate the index for adjusting the control characteristics. Specifically, when the driver has a desire to cruise the vehicle, the index is weighted in accordance with the vehicle speed. The control example will be explained hereinafter.

Figure 1:
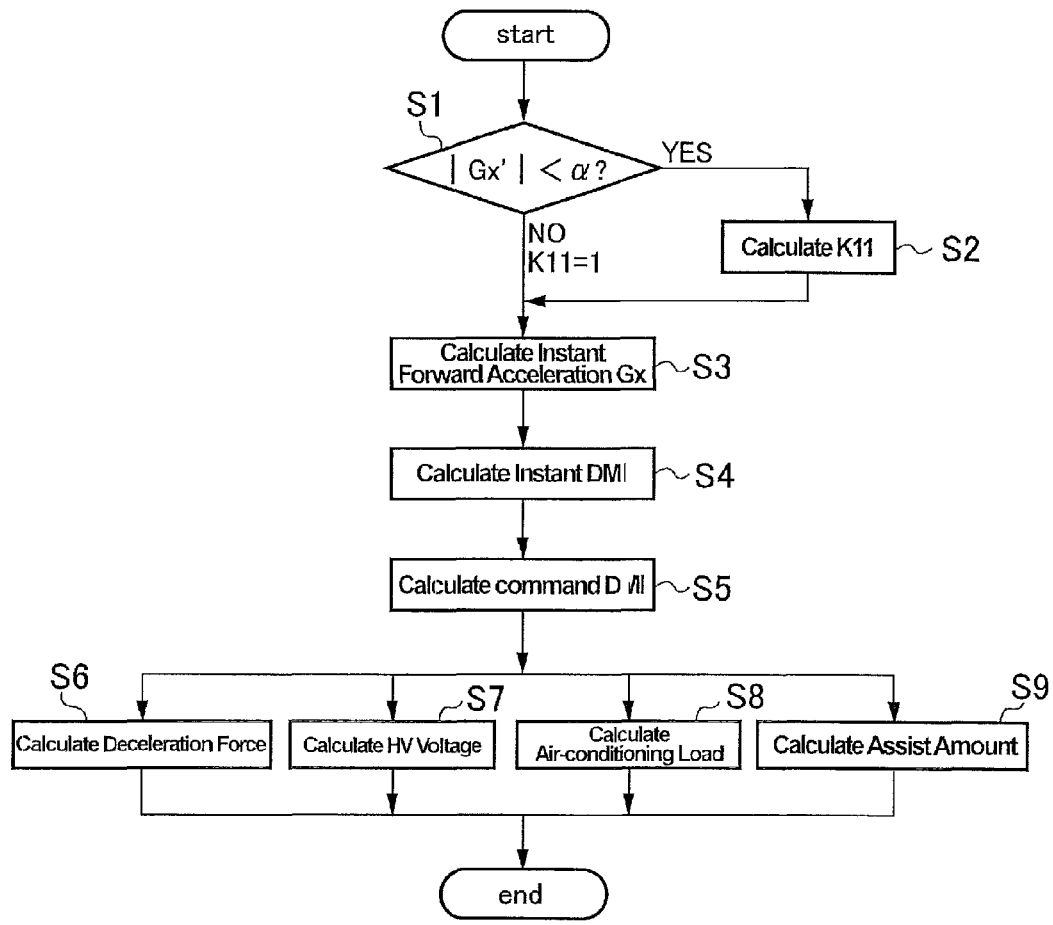
FIG. 1 is a flowchart showing one example of the control carried out by the vehicle control system according to the present invention.

Turning to FIG. 1, there is shown a flowchart explaining one example of the control carried out by the vehicle control system to weight an acceleration Gx' and to calculate the index based on the weighted acceleration. Here, it is to be noted that the actual acceleration Gx' includes both absolute values of the detected instant accelerations in the forward direction and in the longitudinal direction. The routine shown in FIG. 1 is repeated at predetermined short interval. First of all, it is determined whether or not an absolute value of the actual acceleration Gx' is smaller than a predetermined value α (at step S1). The predetermined value α is a threshold used to determine a fact that the driver intends to cruise the vehicle from the present to few seconds later. To this end, the predetermined value α is determined based on an experimental result. That is, at step S1, it is determined whether or not the vehicle is cruising or whether or not the driver intends to cruise the vehicle.

Figure 2:
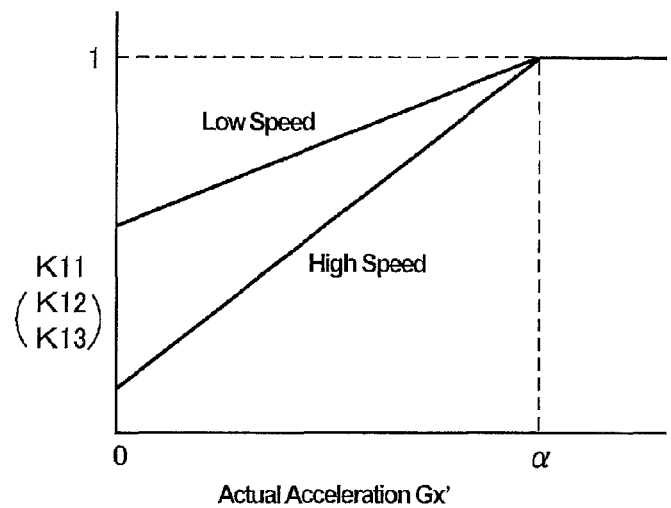
FIG. 2 is a diagram showing a relation between a factor used in the control and an absolute value of instant (longitudinal) acceleration.
Figure 11:
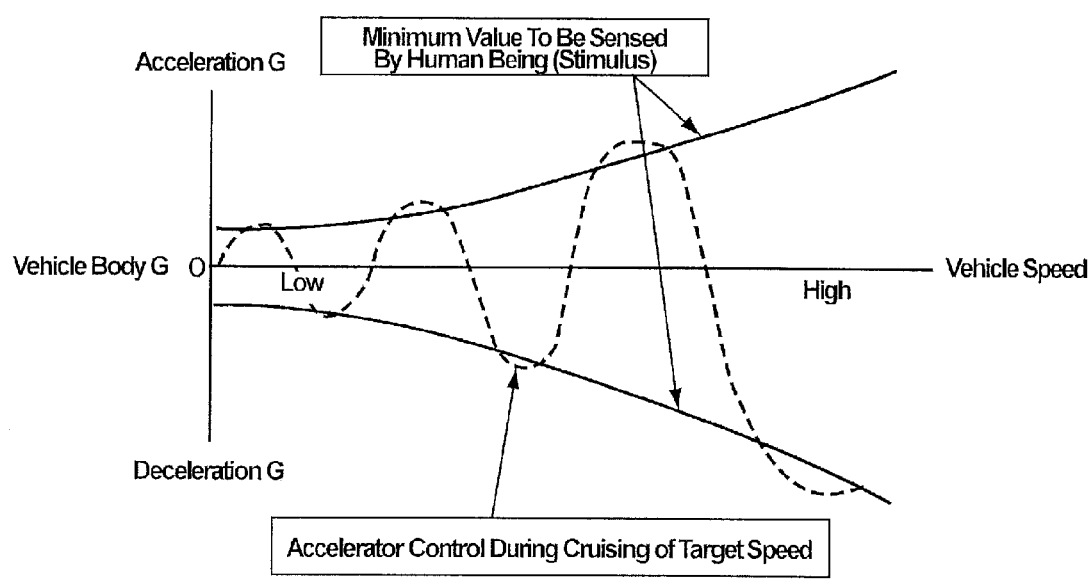
FIG. 11 is a graph showing a relation between a minimum value of a change in acceleration that can be sensed by the driver and a vehicle speed, and a situation in which an operating range of an accelerator is widened with an increase in vehicle speed during keeping the vehicle cruising.

If the actual acceleration Gx' is smaller than the predetermined value α so that the answer of step S1 is YES, a weighting factor K11 is calculated (at step S2). Specifically, given that the actual acceleration Gx' is larger than the predetermined value α, the factor K11 is set to a constant value such as "1". By contrast, given that the actual acceleration Gx' is smaller than the predetermined value α, the factor K11 is set in accordance with the actual acceleration Gx' and the vehicle speed (0<K11<1). Specifically, as shown in FIG. 2, the factor K11 is set to a smaller value with a reduction in the absolute value of instant acceleration (i.e., an instant actual acceleration in the forward or longitudinal direction), and with an increase in the vehicle speed. That is, as can be seen from FIG. 2, an inclination of the line representing a relation between the factor K11 and the actual instant acceleration Gx' in the high speed range is steeper than the other line in the low speed range. Specifically, given that the actual instant acceleration Gx' is "0", the factor K11 is reduced at a high speed, and increased at a low speed. This is because the minimum value of the instant acceleration in the longitudinal direction that can be sensed by the driver differs depending on the vehicle speed as explained with reference to FIG. 11.

Figure 3:
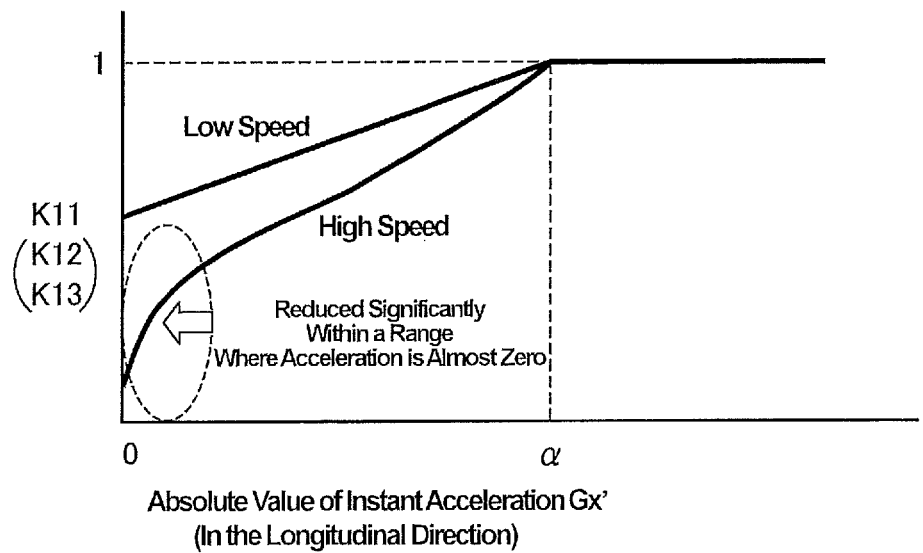
FIG. 3 is a diagram showing another relation between a factor used in the control and an absolute value of instant (longitudinal) acceleration.

In FIG. 2, definition of "low speed" is a speed at which the driver can easily sense a change in the instant acceleration in the longitudinal direction during cruising the vehicle, and definition of "high speed" is a speed at which the driver cannot easily sense a change in the instant acceleration in the longitudinal direction during cruising the vehicle. Those speeds are also determined based on an experimental result. Optionally, the factor K11 at an intermediate speed may also be prepared. As shown in FIG. 3, a reduction rate of the factor K11 may be increased within a range where the actual instant acceleration Gx' in the longitudinal direction is almost "0", instead of changing the factor K11 linearly. In the example shown in FIG. 3, the factor K11 is also changed continuously to reduce discomfort resulting from changing the factor K11 in accordance with changes in the vehicle speed and the acceleration. In this case, the intention of the driver to cruise the vehicle can be detected more accurately at the high speed range, as compared to the case shown in FIG. 2. Therefore, the driver is allowed to cruise the vehicle more easily according to his/her intention.

Figure 4:
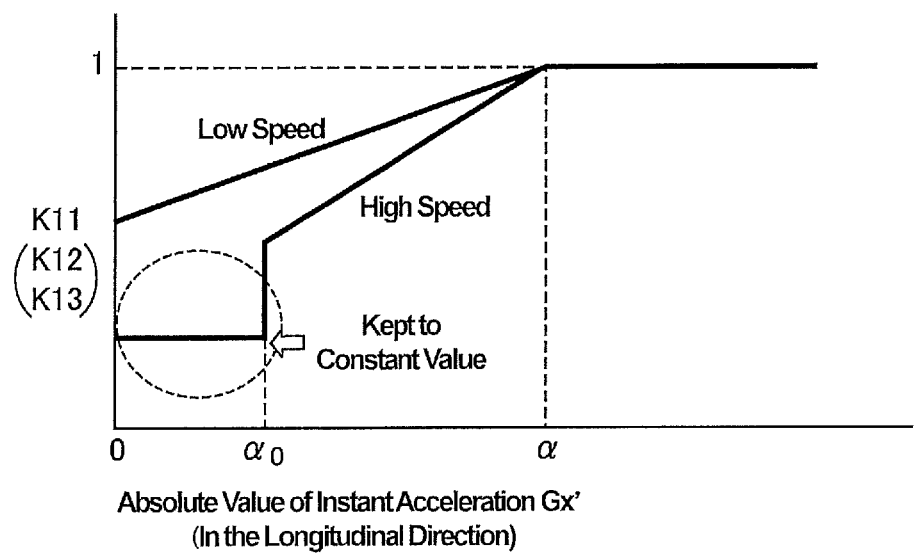
FIG. 4 a diagram showing still another relation between a factor used in the control and an absolute value of instant (longitudinal) acceleration.

Instead, as shown in FIG. 4, the factor K11 reduced with a reduction in the actual instant acceleration Gx' may also be kept to a constant value within a range where the instant acceleration Gx' is smaller than another predetermined value $\alpha 0$ that is smaller than the aforementioned predetermined value $\alpha$ when the vehicle is cruising at a speed higher than a predetermined speed. In this case, the weight on the index with respect to an operating amount of the accelerator is lightened in the high speed range where the actual instant acceleration Gx' is small. Therefore, the driver is allowed to cruise the vehicle more easily according to his/her intention.

Figure 5:
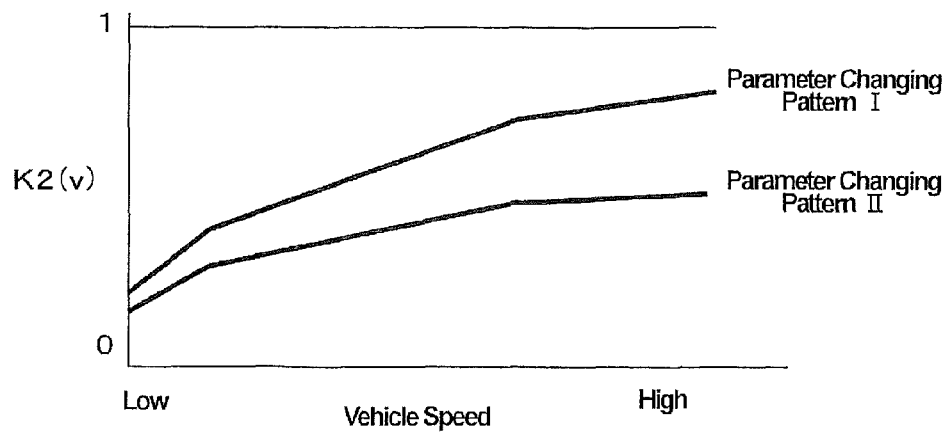
FIG. 5 is a diagram showing one example of a weighting factor based on a vehicle speed.

If the answer of step S1 is NO, or after setting the factor K11 at step S2, an instant forward acceleration Gx is calculated (at step S3). Specifically, the instant forward acceleration Gx is an acceleration value used to calculate the index representing driving preference of the driver, and that is calculated based on a weighted value of the actual instant acceleration Gx'. Alternatively, as shown in FIG. 5, the instant forward acceleration Gx may also be calculated based on the weighted value of the actual instant acceleration Gx' and a weighted value of a parameter representing an accelerating operation of the driver such as an opening degree or an opening rate of the accelerator. Specifically, the opening rate of the accelerator is a percentage of an actual depressing amount of the accelerator pedal 12 provided that the opening degree of the accelerator of the case in which the accelerator pedal 12 is fully depressed is expressed as "100" or "8/8". The detected opening rate of the accelerator is weighted by a predetermined factor K2 (0<K2≤1) that is varied in accordance with the vehicle speed. The factor K2 is similar to the weighting factor "Kacc2(v)", and that is determined based on an experimental result. For example, as shown in FIG. 5, there are two patterns to change the factor K2. Specifically, the factor K2 is changed based on the parameter changing pattern I in case an absolute value of the actual instant acceleration Gx' is larger than the predetermined value $\alpha$, and the factor K2 is changed based on the parameter changing pattern II in case an absolute value of the actual instant acceleration Gx' is smaller than the predetermined value $\alpha$. According to the pattern I, the factor K2 is reduced with a reduction in the vehicle speed. On the other hand, according to the pattern II, the weight on the opening degree of the accelerator is lightened, and such reduction in the weight is increased with an increase in the vehicle speed. The changing pattern of the factor K2 should not be limited to the above-explained two patterns, but may be changed in accordance with a difference from the actual instant acceleration Gx' or the predetermined value $\alpha$. In this case, the factor K2 is reduced with a reduction in the actual instant acceleration Gx' to lighten the weight on the opening degree of the accelerator. As described, acceleration sensible by the driver is easily to be established within the low speed range, but the acceleration is not easily to be increased sufficiently to be sensed by the driver within the high speed range. Therefore, a degree to reflect the parameter representing the operation of the accelerator on the index representing the driving preference of the driver is varied in accordance with the vehicle speed. At step S3, after thus weighting the actual acceleration rate by the factor changed in accordance with the vehicle speed, the instant forward acceleration Gx is calculated while weighting by the factor K11 calculated based on the actual instant acceleration Gx' and the vehicle speed, as expressed by the following expression:

$$Gx=K2 \cdot K11 \cdot PA+(1-K2 \cdot K11)Gx'$$

where PA is the opening rate of the accelerator.

Then, the instant DMI as the first index is calculated based on the instant forward acceleration Gx thus calculated on the basis of longitudinal acceleration Gx and lateral acceleration Gy (at step S4), using the following formula similar to that described in the above-mentioned PCT international publication WO 2013/011572:

$$\text{Instant } DMI=(Gx^2+Gy^2)^{1/2}.$$

Thus, the instant DMI is calculated based on an absolute value of a synthesized acceleration of longitudinal acceleration and lateral acceleration, and hence the instant DMI is changed over time.

Then, the command DMI as the second index is calculated based on the instant DMI thus calculated (at step S5). As explained later, the command DMI is used to set or adjust the control characteristics. To this end, the instant DMI may be used as the command DMI with or without being processed. Alternatively, given that the actual instant acceleration Gx' is smaller than the predetermined value $\alpha$, the command DMI may also be calculated by weighting the instant SPI described in the PCT publication WO 2013/011572 by the factor K2 varied in accordance with the vehicle speed and the factor K11 obtained based on the instant actual forward acceleration and the vehicle speed. In any of those cases, the command DMI is changed in accordance with the actual instant acceleration Gx' calculated based on the driver's intention.

The driver's intention to enhance agility of the vehicle can be estimated based on an increase in the command DMI. Therefore, as shown in FIG. 1, various kinds of control characteristics are adjusted based on the command DMI. To this end, based on the command DMI, a deceleration force is calculated (at step S6), a voltage to propel the hybrid vehicle (i.e., HV voltage) is calculated (at step S7), an air conditioning load is calculated (at step S8), and an operation assisting amount is calculated (at step S9). Here, definition of the deceleration force is a braking force acting on an opposite direction to the travelling direction to decelerate the vehicle.

As to the deceleration force, provided that the command DMI is larger than a predetermined reference value (e.g., the predetermined value α), the control characteristic of the deceleration force is adjusted in such a manner that the deceleration force is increased with an increase in the command DMI. By contrast, provided that the vehicle is cruising or running at a substantially constant speed and hence the actual instant acceleration Gx' is smaller than the predetermined reference value, the actual instant acceleration Gx' is weighted to be reduced. Consequently, the instant DMI is reduced to adjust the control characteristic of the deceleration force in such a manner to reduce the deceleration force. In this case, therefore, a deviation between the command DMI and the instant DMI is widened. Consequently, a predetermined condition to reduce the command DMI such as an exceedance of a temporal integration of the deviation between the command DMI and the instant DMI is satisfied easily so that the command DMI is reduced promptly during cruising or running at a substantially constant speed. For this reason, when the opening degree of the accelerator is reduced to be smaller than a predetermined value close to "0" during cruising at a speed higher than a predetermined speed, a so-called "free-run" can be executed by interrupting a torque transmission between the engine and the driving wheels to save the fuel. By contrast, given that the actual instant acceleration Gx' is equal to or larger than the predetermined value α, the actual instant acceleration Gx' will be decreased slightly or will not be corrected so that agility of the vehicle is maintained. Thus, if the driver intends to drive the vehicle in a sporty manner, agility of the vehicle can be maintained. By contrast, if the driver intends to cruise the vehicle, the deceleration force is prevented from being changed significantly by a slight change in the opening degree of the accelerator. In addition, fuel efficiency can be improved.

The HV voltage is a control voltage applied to the motor functioning as a prime mover, and if the command DMI is larger than a predetermined value, the control characteristic of the HV voltage is adjusted in such a manner that the voltage applied to the motor is increased to generate larger driving force in accordance with the command DMI. Then, when the accelerator pedal is returned to cruise the vehicle, the command DMI is decreased promptly in line with the driver's intention. That is, the control characteristic of the HV voltage is adjusted in such a manner to lower the voltage. Consequently, electrical loss is reduced to improve energy efficiency so that the fuel can be saved. Thus, the driving force of the vehicle is reduced with a reduction in the HV voltage during cruising in which the actual instant acceleration Gx' representing the driver's intention is small. For this reason, the HV voltage can be controlled according to the driver's intention.

Provided that the command DMI is large, the air conditioning load is adjusted in such a manner that a difference between an internal temperature and an external temperature is widened. Specifically, a target temperature is lowered if cooling the vehicle interior, and raised if warming the vehicle interior. Then, when the accelerator pedal is returned to cruise the vehicle, it is conceivable that the driver intends to save the fuel. In this case, the actual instant acceleration Gx' is decreased to be smaller than the predetermined value α and hence the actual instant acceleration Gx' is weighted to be decreased. Consequently, the command DMI is decreased so that the control characteristic of the air conditioner is adjusted in such a manner to narrow the deviation between the internal temperature and the external temperature. Specifically, the target temperature is raised if cooling the vehicle interior, and a target temperature is lowered if warming the vehicle interior to save the fuel.

The above-mentioned operation assisting amount is an assisting amount of a steering force established by the electrical power-steering system. Specifically, provided that the command DMI is large, the assisting amount is increased to enhance agility of the vehicle. If the driver intends to cruise or turn the vehicle and hence the vehicle speed is not changed significantly, the actual instant acceleration Gx' is reduced to be smaller than the predetermined value α. In this case, the actual instant acceleration Gx' is weighted to be decreased so that the command DMI is decreased. Consequently, the assisting amount is reduced. In this case, therefore, power to be consumed to assist the steering force is reduced so that the fuel can be saved during cruising the vehicle according to the driver's intention without depressing the accelerator pedal.

Next, here will be explained another control example to be carried out by the vehicle control system according to the present invention. As described, the vehicle control system according to the present invention is configured to calculate the index for adjusting the control characteristics or determining driving preference of the driver based on data concerning the longitudinal acceleration. To this end, if the vehicle is cruising at a substantially constant speed and hence the instant acceleration Gx' in the longitudinal acceleration is smaller than the predetermined value α, a degree to reflect the actual instant acceleration Gx' on the index is reduced. According to the present invention, such index is not limited to the above-explained command SPI, but other kind of index calculated based on data concerning the running condition changed by an accelerating operation, a steering operation or the like can be used to adjust the control characteristics or to determine the driver's preference. Specifically, in the example shown in FIG. 6, the instant DMI is used as the index to adjust the control characteristics.

Figure 6:
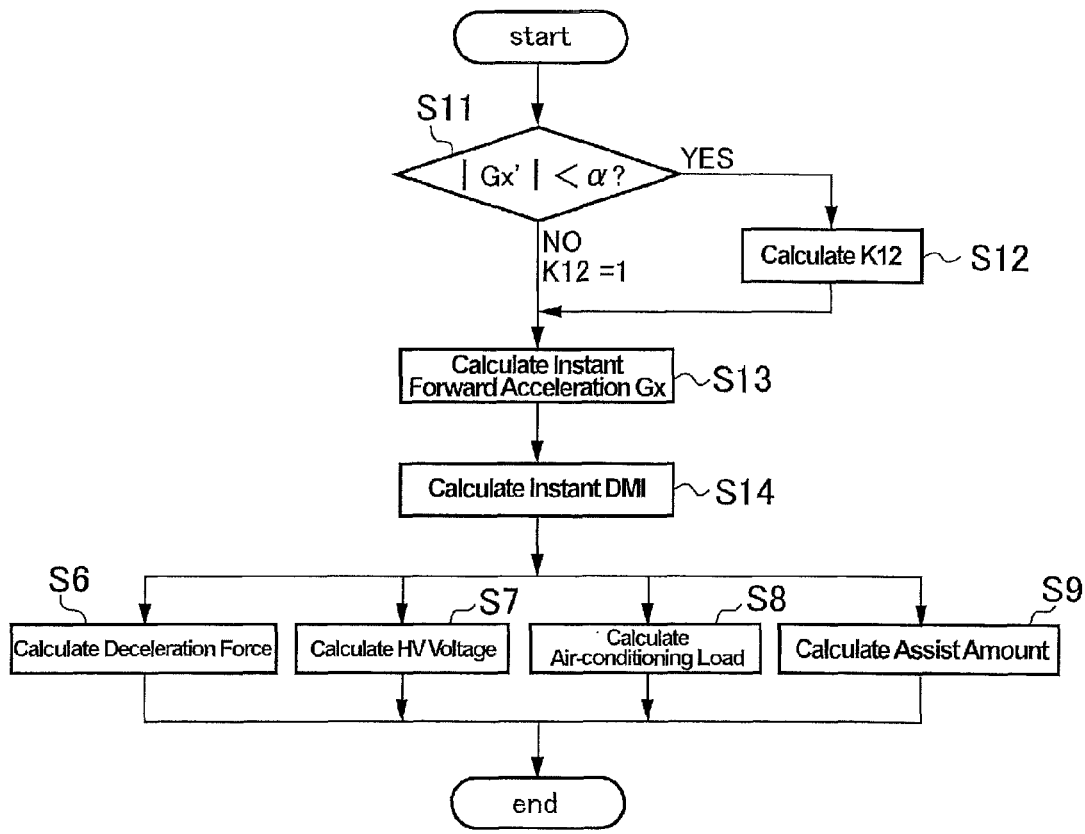
FIG. 6 is a flowchart showing another example of the control carried out by the vehicle control system according to the present invention.

According to the example shown in FIG. 6, first of all, it is determined whether or not an absolute value of the actual acceleration Gx' is smaller than a predetermined value α (at step S11). The control content at step S11 is similar to that of step S1 of the example shown in FIG. 1. If the actual acceleration Gx' is smaller than the predetermined value α so that the answer of step S11 is YES, a weighting factor K12 is calculated (at step S12). The factor K12 may be determined at a design phase, and the aforementioned factor K11 may be used as the factor K12. Alternatively, the factor K12 may also be differentiated from the factor K11. As the factor K11 shown in FIGS. 2 to 4, the factor K12 is set to a larger value when the vehicle speed is high, and decreased with a reduction in the actual instant acceleration Gx'.

If the answer of step S11 is NO, or after setting the factor K12 at step S12, an instant forward acceleration Gx is calculated (at step S13). As described, the instant forward acceleration Gx is an acceleration value used to calculate the index representing driving preference of the driver, and that is calculated based on a weighted value of the actual instant acceleration Gx'. As also described, the longitudinal acceleration is difficult to be generated and sensed at a high speed range, therefore, accuracy of estimating the driver's intention can be improved by weighting the acceleration value in accordance with the vehicle speed. Specifically, the acceleration value is weighted by a predetermined factor K3 (0<K3≤1) representing sensibility in accordance with the vehicle speed. A relation between the factor K3 and the vehicle speed may also be determined in the same manner as that of the factor K2 shown in FIG. 5. Here, a value of the factor K3 may be set not only to a same value as the factor K2 but also to a different value. At step S13, the instant longitudinal acceleration Gx is calculated by weighting the actual instant acceleration Gx' in accordance with the vehicle speed, and further weighting the actual instant acceleration Gx' by the factor K12, as expressed by the following expression:

$$Gx = K3 \cdot K12 \cdot Gx'.$$

Then, the instant DMI used in the example shown in FIG. 6 is calculated based on the instant longitudinal acceleration Gx (at step S14), using the following formula similar to that described in the above-mentioned PCT international publication WO 2013/011572:

$$\text{Instant } DMI = (Gx^2 + Gy^2)^{1/2}.$$

Thus, the instant DMI is calculated based on an absolute value of a synthesized acceleration of longitudinal acceleration and lateral acceleration, and hence the instant DMI is changed over time.

Thus, the instant DMI represents the driving preference of the driver estimated from the acceleration. That is, a reduction in the instant DMI represents a fact that the driver intends to cruise at a substantially constant speed or to drive the vehicle in a mild manner. Therefore, as also shown in FIG. 6, various kinds of control characteristics are adjusted based on the instant DMI. To this end, based on the instant DMI, a deceleration force is calculated (at step S6); a voltage to propel the hybrid vehicle (i.e., HV voltage) is calculated (at step S7), an air conditioning load is calculated (at step S8), and an operation assisting amount is calculated (at step S9). Those calculation are similar to those in the example shown in FIG. 1, and detailed explanations for those calculations are therefore omitted.

Figure 7:
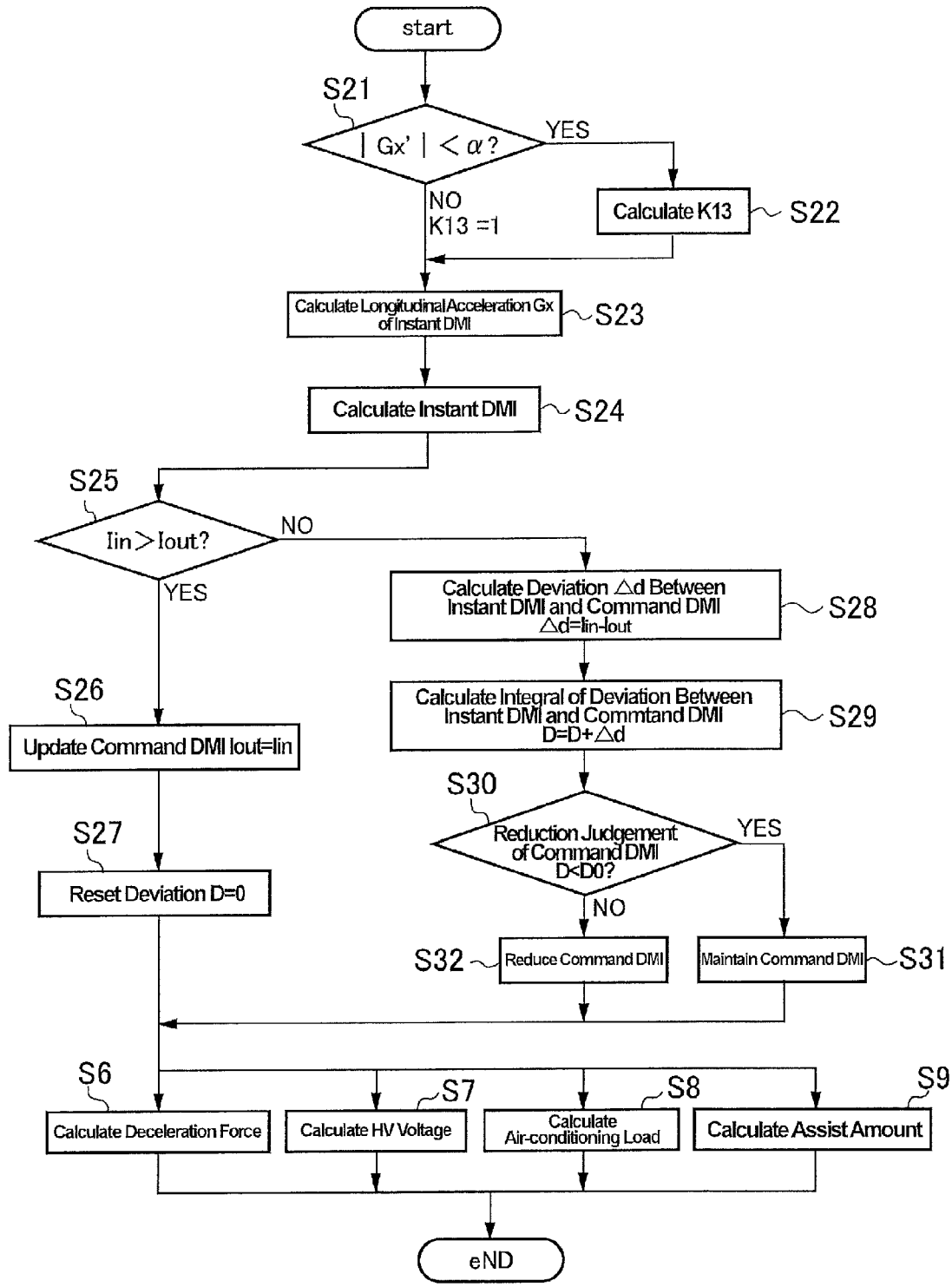
FIG. 7 is a flowchart showing still another example of the control carried out by the vehicle control system according to the present invention.

As described, according to the present invention, the command DMI is calculated based on the actual instant acceleration Gx' weighted by the factor changed in accordance with the vehicle speed, and the factor determined depending on a value of the weighted actual instant acceleration Gx'. According to the present invention, the command DMI may also be calculated in such a manner that a relation between the instant DMI and the command DMI is assimilated to that between the instant SPI and the command SPI taught by PCT international publication WO 2013/011572, and the above-explained control characteristics may be adjusted by the command DMI thus calculated. A control example of this case is shown in FIG. 7, and according to the example shown in FIG. 7, the command DMI is calculated by the procedure similar to that in the example shown in FIG. 6. Specifically, first of all, it is determined whether or not the actual acceleration Gx' detected by the sensor is smaller than the predetermined value α (at step S21). If the answer of step S21 is YES, a weighting factor K13 determined in accordance with the actual instant acceleration Gx' is obtained (at step S22). The factor K13 may be determined in a similar manner to those of the cases of determining the factor K11 shown in FIG. 1 or 2 and the factor K12 shown in FIG. 6, and a value of the factor K13 may be assimilated to those of the factors K11 and K12.

By contrast, if the answer of step S21 is NO, the factor K13 is set to "1", and the instant longitudinal acceleration Gx is calculated using the factor 13 set to any of those values (at step S23). At this step, as the example shown in FIG. 6, the actual instant acceleration Gx' weighted by the factor K4 changed in accordance with the vehicle speed may be weighted by the factor K13. The weighting factor K4 (0<K4≤1) also represents sensibility in accordance with the vehicle speed. That is, a relation between the factor K4 and the vehicle speed may also be determined in the same manner as that of the factor K2 shown in FIG. 5 or the factor K3 shown in FIG. 6. Here, a value of the factor K4 may be set not only to a same value as the factor K2 or K3 but also to a different value. At step S23, the instant longitudinal acceleration Gx is calculated by weighting the actual instant acceleration Gx' in accordance with the vehicle speed, and further weighting the actual instant acceleration Gx' by the factor K13, as expressed by the following expression:

$$Gx = K4 \cdot K12 \cdot Gx'.$$

Then, as the examples shown in FIGS. 1 and 6, the instant DMI is calculated based on the instant longitudinal acceleration Gx (at step S24).

Then, as taught by PCT international publication WO 2013/011572, the command DMI is set to a local maximum value of the instant DMI thus calculated over time, and held until updated again upon exceedance of the instant DMI over the command DMI. According to the example shown in FIG. 7, specifically, it is determined whether or not a value $I_{in}$ of the instant DMI is larger than a value $I_{out}$ of the command DMI (at step S25). If the value $I_{in}$ of the instant DMI is larger than the value $I_{out}$ of the command DMI so that the answer of step S25 is YES, the value $I_{out}$ of the command DMI is updated to the value $I_{in}$ of the instant DMI (at step S26). During the period of holding the command DMI to the current value of $I_{out}$, a deviation between the $I_{in}$ and $I_{out}$ is accumulated. However, when the value $I_{out}$ of the command DMI is updated, a reset of an integral of the deviation D is executed (at step S27). Specifically, the integral of the deviation D is reset to 0 as expressed below:

$$D = 0.$$

By contrast, if the answer of step S25 is NO, that is, if the value $I_{in}$ of the instant DMI is smaller than the value $I_{out}$ of the command DMI, a deviation Δd between the value $I_{out}$ of the command DMI and the value of the instant DMI is calculated (at step S28). Specifically, the deviation Δd is calculated as expressed by the following expression:

$$\Delta d = I_{out} - I_{in}.$$

Then, an integral of the deviation D between the value $I_{out}$ of the command DMI and the value $I_{in}$ of the instant DMI is calculated (at step S29) as expressed by the following expression:

$$D = D + \Delta d.$$

Then, it is judged whether or not the integral of the deviation D between the value $I_{out}$ of the command DMI and the value $I_{in}$ of the instant DMI is smaller than a reduction starting threshold D0 set in advance (at step S30). Specifically, the reduction starting threshold D0 is used to determine a point of time to start decreasing the value $I_{out}$ of the command DMI being maintained, in other words, the reduction starting threshold D0 is used to define a length of time for maintaining the current value of $I_{out}$ of the command DMI. Therefore, when the integral of the deviation D exceeds the reduction starting threshold D0, a judgment to start decreasing the value $I_{out}$ of the command SPI is carried out.

If the integral of the deviation D between the value $I_{out}$ of the command DMI and the value $I_{in}$ of the instant DMI is smaller than the reduction starting threshold D0 so that the answer of step S30 is YES, the value $I_{out}$ of the command DMI is maintained to the current value (at step S31). By contrast, if the integral of the deviation D between the value $I_{out}$ of the command DMI and the value $I_{in}$ of the instant DMI is larger than the reduction starting threshold D0 so that the answer of step S30 is NO, the routine advances to step S32 to decrease the value $I_{out}$ of the command DMI. In order to reduce discomfort of the driver, a manner to decrease the value $I_{out}$ of the command DMI may be adjusted arbitrarily.

Figure 8:
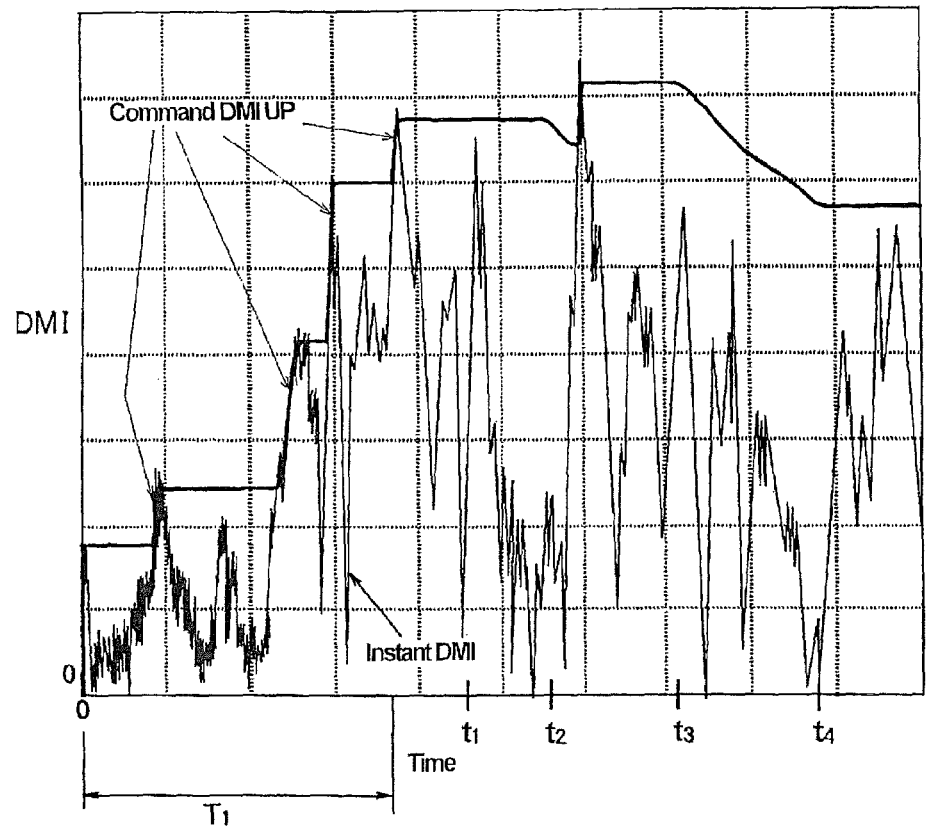
FIG. 8 is a graph indicating an example of obtaining a command DMI based on an instant DMI used in the control carried out by the vehicle control system according to the present invention.

An example of a change in the command DMI in accordance with a change in the instant DMI is shown in FIG. 8. In FIG. 8, the command DMI is indicated by a heavy line. During a period T1 from a commencement of the control, the instant SPI calculated based on the acceleration of the vehicle is fluctuated in response to a change in the acceleration, and increased locally to a maximum value prior to a satisfaction of the predetermined condition to update the command DMI. In this situation, the command DMI is set on the basis of each local maximum value of the instant DMI. Therefore, the command DMI is increased stepwise during the period T1. Then, when the condition to decrease the command DMI is satisfied at a time point t2 or t3, a reduction of the command DMI is started. That is, the command DMI is decreased if the current command DMI thus held seems not to comply with the driver's intention. Specifically, according to the present invention, such condition to decrease the command DMI is satisfied according to elapsed time.

More specifically, the above-mentioned condition in which "the current command DMI being held seems not to comply with the driver's intention" is a situation in which a divergence between the command DMI being held to the current value and the current instant DMI is relatively large and such divergence between those indexes is being continued. That is, the command DMI will not be decreased even if the instant DMI is lowered by an unintentional deceleration. For example, the command DMI will not be decreased in case the accelerator pedal is returned temporarily by a habit of the driver, or to maintain the vehicle speed temporarily after accelerating the vehicle. By contrast, in case the instant DMI is fluctuating below the command DMI for a certain period of time so that the integral of deviation therebetween is increased, the aforementioned condition to decrease the command DMI is satisfied. Thus, although not shown in FIG. 7, the length of time in which the instant DMI stays below the command DMI may be used as the condition to decrease the command DMI. In order to reflect the driver's intention more accurately on the command DMI, a temporal integration (or accumulation) of the deviation between the command DMI being maintained and the instant DMI may be used as the condition to decrease the command DMI. In this case, the command DMI is decreased when the temporal integration of the deviation between those indexes reaches a predetermined threshold. For this purpose, this threshold may be determined arbitrarily on the basis of a driving test or simulation. In case of using the temporal integration as the condition to decrease the command DMI, the command DMI is to be decreased taking into consideration a duration time of the divergence of the instant DMI from the command DMI, in addition to the deviation therebetween. In this case, therefore, the actual driving condition or behavior of the vehicle can be reflected on the control to change the vehicle behavior more accurately.

Figure 9:
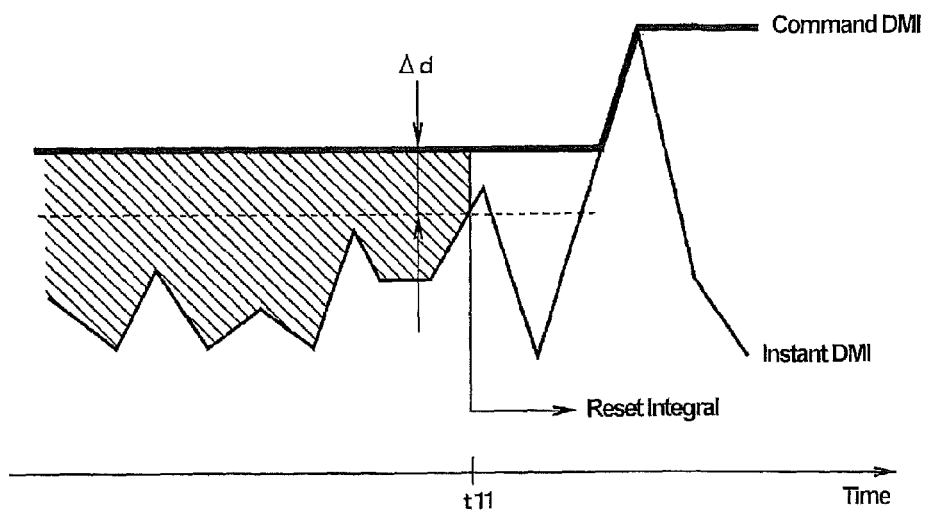
FIG. 9 is a graph indicating the integral of the deviation between the command DMI and the instant DMI fluctuating below the command DMI, and a reset of the integral.

FIG. 9 is a graph indicating the aforementioned integral of the deviation between the command DMI and the instant DMI, and the reset of the integral. In FIG. 9, a shadowed area represents the integral of the deviation between the command DMI and the instant DMI. In the example indicated in FIG. 9, the reset of the integral of the deviation is executed at a time point t1 at which the divergence between the command DMI and the instant DMI becomes smaller than a predetermined value Δd, and the integration of the deviation between those indexes is restarted from the time point t1. Consequently, even if the current command DMI has been held for a long time, the condition to lower the command DMI is prevented from being satisfied at the time point t1 so that the command DMI is maintained to the previous value. Then, when the instant DMI exceeds the command DMI after restarting the integration of the deviation between those indexes, the command DMI is updated to the local maximum value of the instant DMI and held again.

The control characteristics of the vehicle are adjusted based on the command SPI thus updated or maintained. Specifically, as the example shown in FIG. 1, a deceleration force is calculated (at step S6), a voltage to propel the hybrid vehicle (i.e., HV voltage) is calculated (at step S7), an air conditioning load is calculated (at step S8), and an operation assisting amount is calculated (at step S9) based on the command DMI. Detailed explanation for those calculations are omitted.

REFERENCE SIGNS LIST

1: vehicle; 2: front wheel; 3: rear wheel; 4: suspension; 5: shock absorber; 6: motor; 7: brake pedal; 8: internal combustion engine (engine); 10: throttle valve; 11: actuator; 12: accelerator pedal; 13: transmission; 15: steering mechanism; 16: steering wheel; 17: steering linkage; 18: assist mechanism; 19: wheel speed sensor; 20: accelerator sensor; 21: throttle sensor; 22: engine speed sensor; 23: output speed sensor; 24: steering angle sensor; 25: longitudinal acceleration sensor; 26: lateral acceleration sensor; 27: a yaw rate sensor; 28: electronic control unit (ECU).

The invention claimed is:

1. A vehicle control system, which is configured to calculate an index based at least on a longitudinal acceleration of a vehicle established by an operation of a driver in a manner that the index is increased with an increase in the acceleration, and to set or adjust control characteristics of the vehicle in a manner that agility of the vehicle is enhanced with an increase in the index and that agility of the vehicle is moderated with a reduction in the index, comprising:
an electronic control unit that is configured to weight to decrease a value of the index upon reduction in an absolute value of acceleration detected continuously during propulsion of the vehicle to fall below a predetermined value toward zero, as compared to that of a case in which the absolute value of the instant acceleration is larger than the predetermined value; and
wherein the acceleration includes at least any of an instant forward acceleration established by operating an accelerator, an instant longitudinal acceleration established by operating the accelerator or a brake, and an instant synthesized acceleration of the instant longitudinal acceleration and an instant lateral acceleration established by operating a steering wheel.

2. The vehicle control system as claimed in claim 1, wherein the electric control unit is further configured to:

calculate the index based on a weighted value of the instant forward acceleration and a weighted value of an operating amount of the driver in a manner that the index is increased with an increase in the operating amount to change the forward acceleration of the vehicle; and reduce the weight on the operating amount and increase the weight on the instant forward acceleration upon reduction in the absolute value of any of the instant forward acceleration, the instant longitudinal acceleration, and the instant synthesized acceleration to fall below a predetermined value toward zero, as compared to those of a case in which the absolute value of the instant acceleration is larger than the predetermined value.

3. The vehicle control system as claimed in claim 2, wherein the weight on the operating amount includes a weight to suppress a change in a value of the index with an increase in the vehicle speed.

4. The vehicle control system as claimed in claim 2,
wherein the operating amount includes an opening degree of an accelerator, and
wherein the weight on the operating amount includes a weight to suppress a change in a value of the index with an increase in the opening degree of the accelerator.

5. The vehicle control system as claimed in claim 1, wherein the weight to decrease the index is decreased based on a vehicle speed, and the weight includes a weight to decrease a value of the index with an increase in a vehicle speed under a condition that the absolute value of any of the instant forward acceleration, the instant longitudinal acceleration, and the instant synthesized acceleration is smaller than the predetermined value as compared to that of a case in which the vehicle speed is low.

6. The vehicle control system as claimed in claim 1, wherein the weight to decrease the index includes a weight to decrease the index upon reduction in the absolute value of any of the instant forward acceleration, the instant longitudinal acceleration, and the instant synthesized acceleration to fall below a predetermined value toward zero, and with an increase in the vehicle speed, as compared to that of a case in which the vehicle speed is low.

7. The vehicle control system as claimed in claim 1,
wherein the index is calculated based on the instant acceleration obtained continuously during propulsion of the vehicle, and held to a value calculated based on the absolute value, and
wherein the index includes a command index that is set to the absolute value of the instant acceleration, and updated upon exceedance of the value being held to be held thereto.

8. The vehicle control system as claimed in claim 1
wherein the electronic control unit is further configured to calculate a command index based on the instant acceleration obtained continuously during propulsion of the vehicle, to update the command index when the absolute value of the instant acceleration exceeds the current value of the command index calculated based on a prior absolute value of the instant acceleration, and to hold the command index thereto; and
to decrease the command index being held upon satisfaction of a predetermined condition;
wherein the predetermined condition is satisfied based on an elapsed time in which the instant acceleration stays below the command index being held.

9. The vehicle control system as claimed in claim 1, wherein the weighting includes a numerical processing to reduce the absolute value of the instant acceleration.

10. The vehicle control system as claimed in claim 1, wherein the weighting includes a processing to multiply the absolute value of the instant acceleration by a factor larger than zero but smaller than "1".

11. The vehicle control system as claimed in claim 10, wherein the factor includes a factor that is varied continuously in response to a change in the instant acceleration.

12. The vehicle control system as claimed in claim 1
wherein the electronic control unit is further configured to control a deceleration force of the vehicle; and
to adjust the control characteristics of the vehicle based on the index in a manner to save fuel, by reducing the deceleration force of the vehicle with a reduction in a reduction in a deceleration demand.

13. The vehicle control system as claimed in claim 1,
wherein the vehicle comprises a motor serving as a prime mover, and
wherein the electronic control unit is further configured to adjust a control characteristic of the motor based on the index in a manner to improve an energy efficiency of the motor when the absolute value of the instant acceleration is smaller than the predetermined value.

14. The vehicle control system as claimed in claim 1,
wherein the vehicle comprises an air conditioner, and
wherein the electronic control unit is further configured to adjust a control characteristic of the air conditioner based on the index in manner to lighten a load on the air conditioner when the absolute value of the instant acceleration is smaller than the predetermined value, as compared to that of the case in which the absolute value of the instant acceleration is larger than the predetermined value.

15. The vehicle control system as claimed in claim 1,
wherein the vehicle comprises an assisting mechanism that assists a steering force, and
wherein the electronic control unit is further configured to adjust a control characteristic of the assisting mechanism based on the index in a manner to reduce an assisting amount of the steering force when the absolute value of the instant acceleration is smaller than the predetermined value, as compared to that of the case in which the absolute value of the instant acceleration is larger than the predetermined value.

* * * * *